United States Patent Office 3,536,316
Patented Oct. 27, 1970

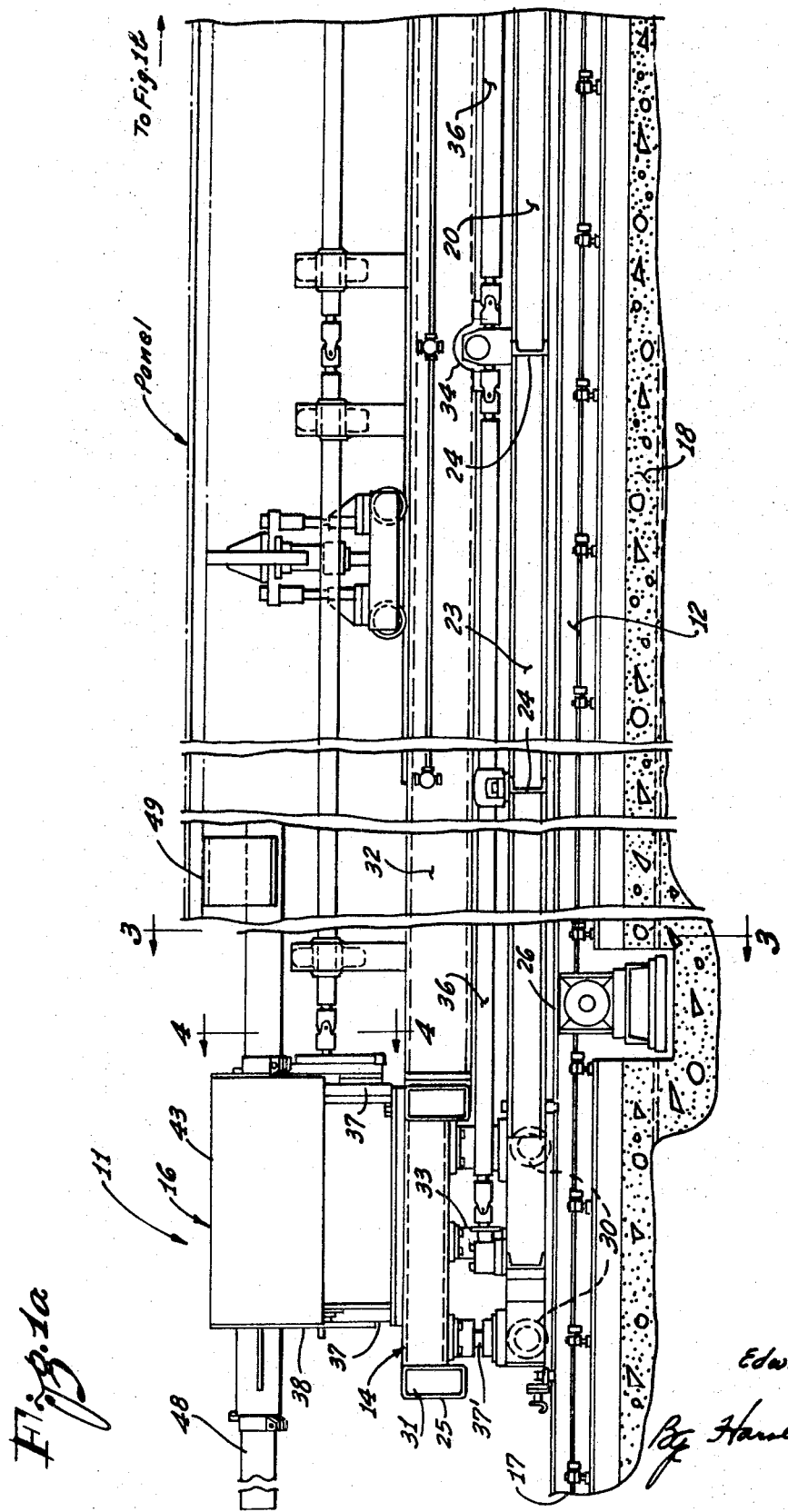

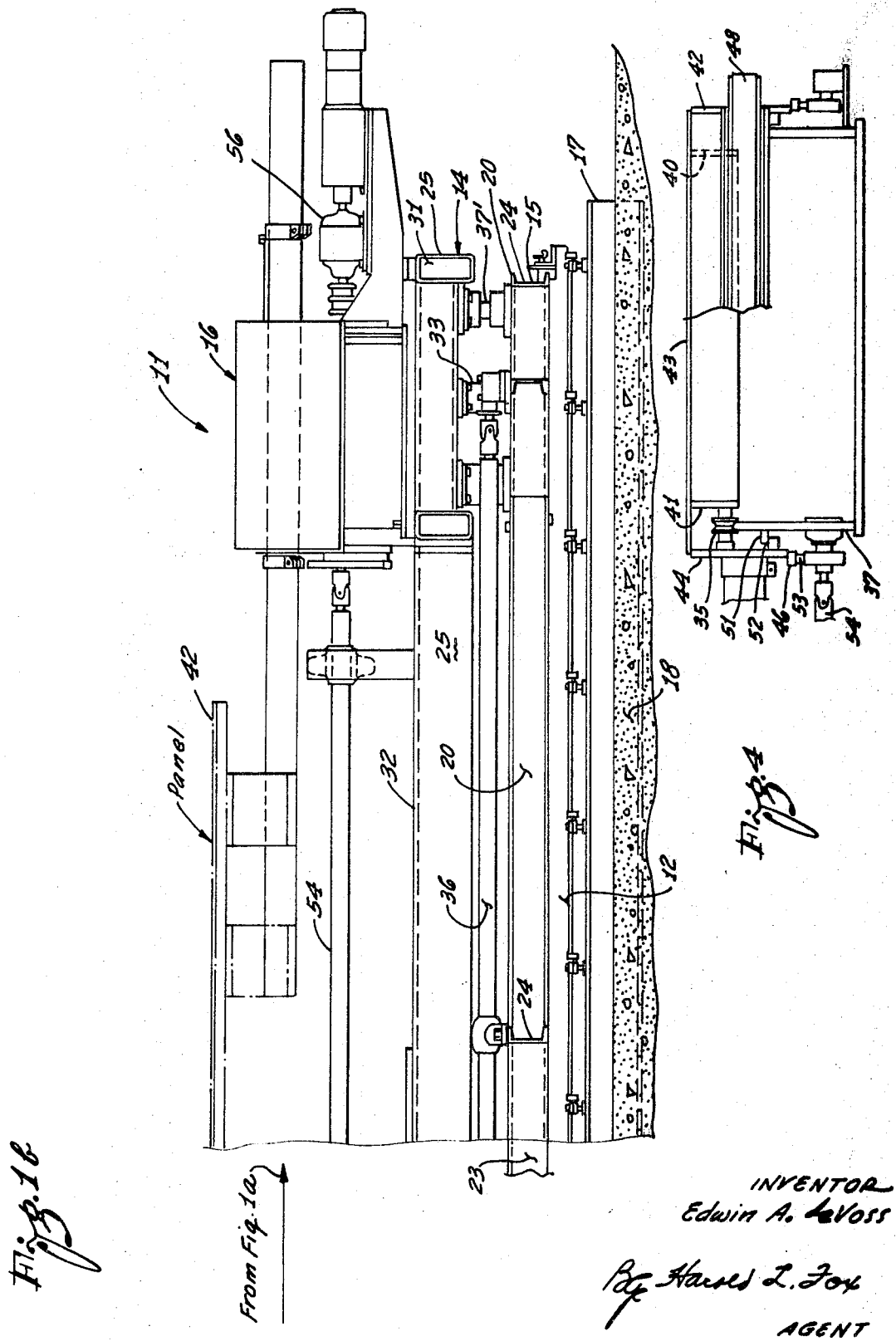

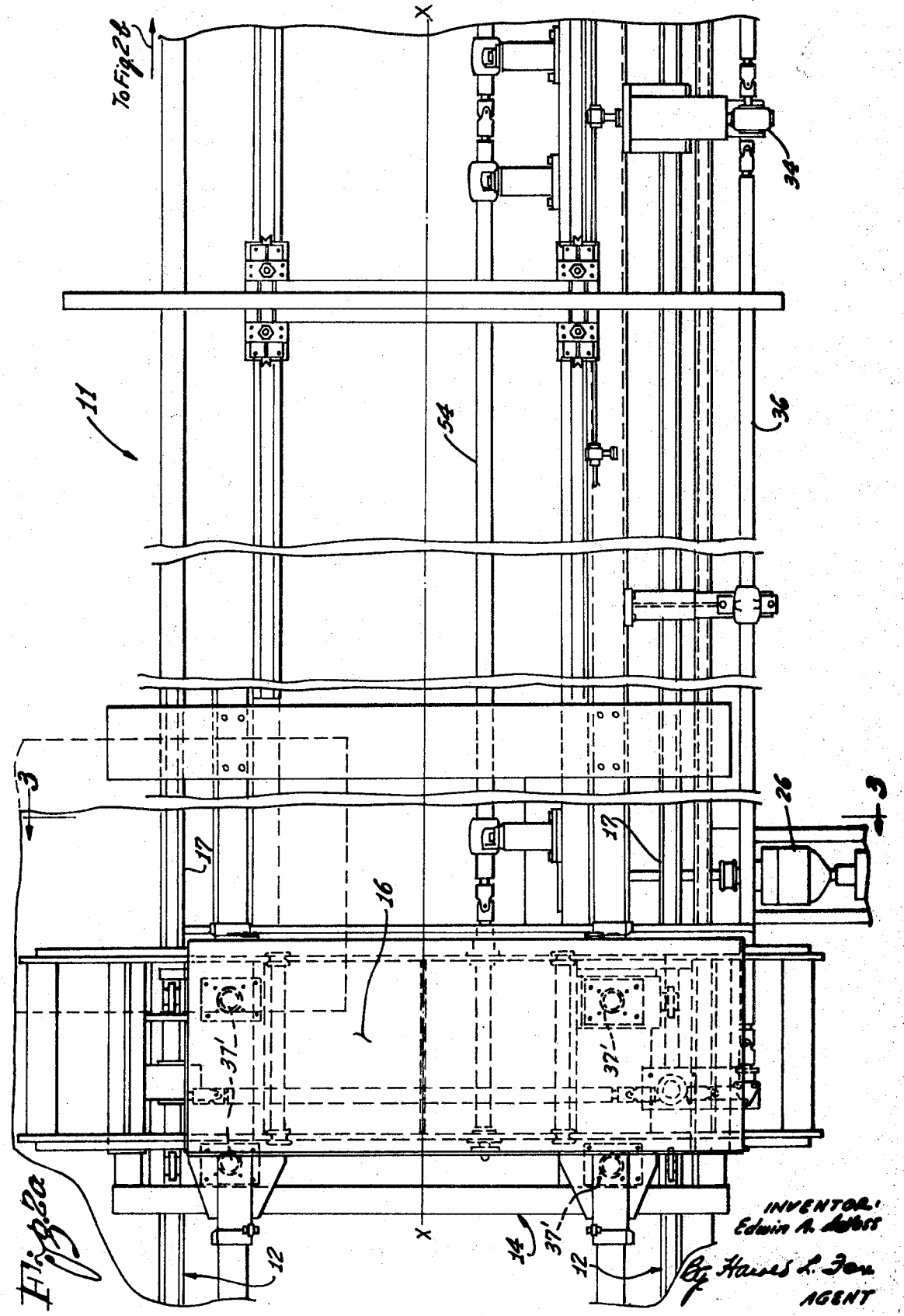

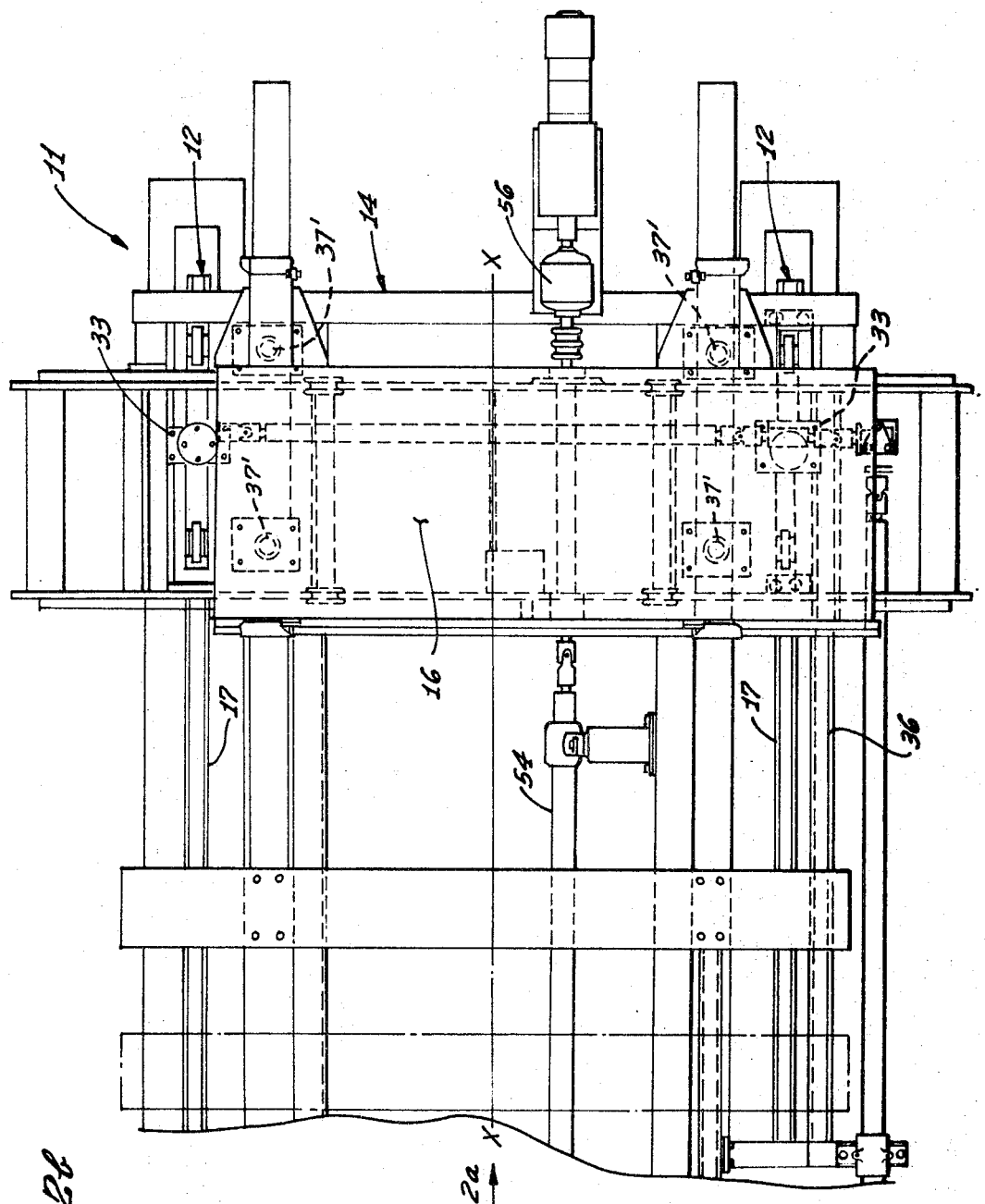

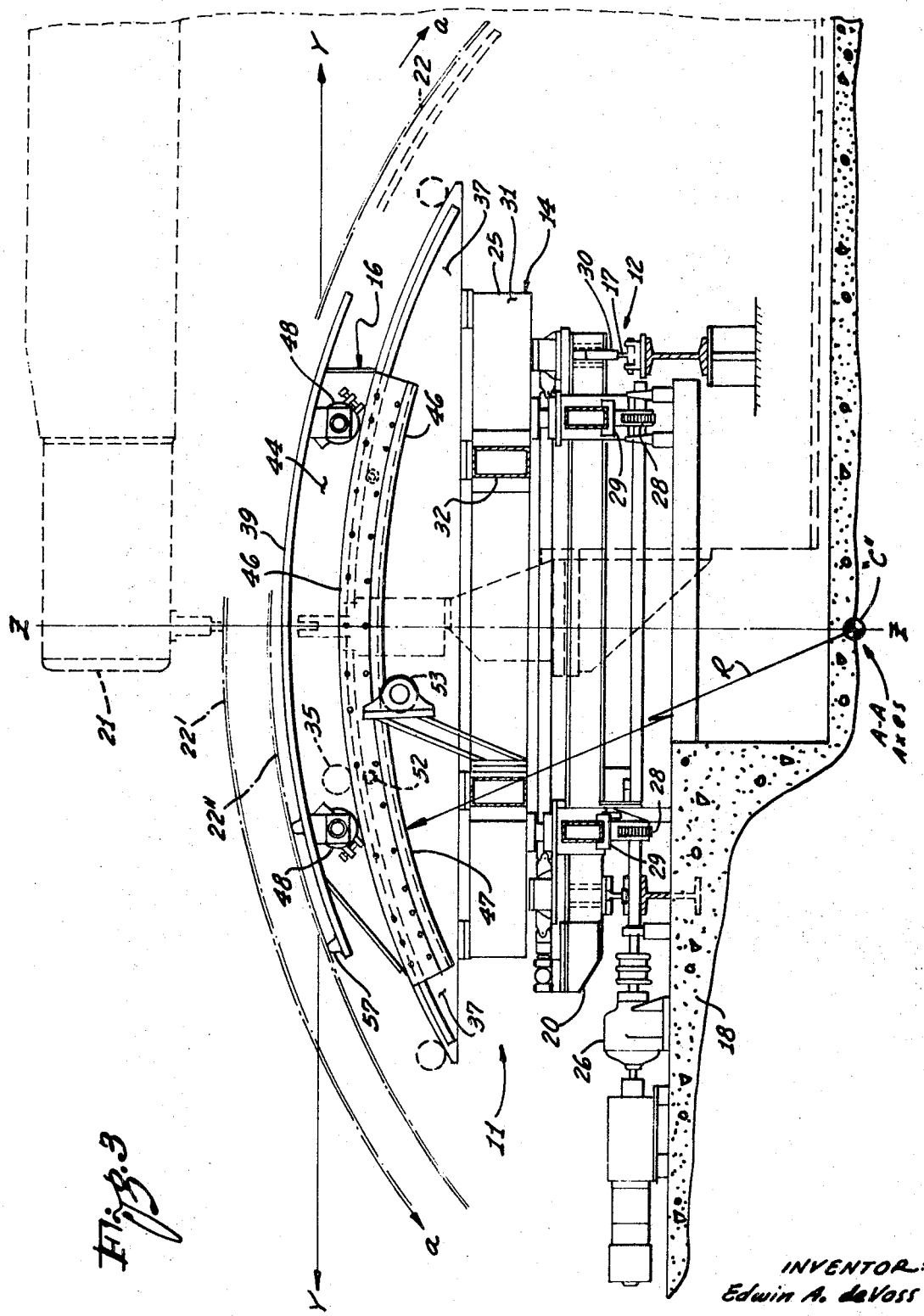

3,536,316
WORK POSITIONER FOR SINGLE
CURVATURE PANELS
Edwin A. de Voss, Torrance, Calif., assignor to Northrop
 Corporation, Beverly Hills, Calif., a corporation of
 California
Filed Aug. 8, 1968, Ser. No. 751,121
Int. Cl. B23q 1/06, 3/18
U.S. Cl. 269—61          6 Claims

ABSTRACT OF THE DISCLOSURE

Apparatus facilitating the fabrication (drilling and riveting) of aircraft panels and the like, the panels constituting portions of hollow cylinders. Upper portions of the apparatus (portions supporting a panel being fabricated) constitute curved surfaces substantially of the same curvature as a panel being fabricated thereon and having a concentric relation with the panel. Apparatus constructed in the manner disclosed herein eliminates the well known panel supporting frame and insuring that the surface (highest longitudinally extending element of the surface) has a normal relation with respect to the working head of the machine effecting the fabrication operation.

---

The present invention pertains to apparatus facilitating the fabrication of panels and the like and more particularly to equipment for holding, positioning and fabricating (drilling and riveting) aircraft panels of constant curvature. In other words the subject panels, especially the outer or cover sheet thereof, constitute portions of a hollow cylinder. In the present instance, we refer to panels comprising portions of cylinders, approximately twenty feet (240") in diameter, twenty feet (20') in length and six to eight feet (6'–8') in width. Such panels are utilized in the fabrication of aircraft referred to as jumbo and airbus planes.

It will be understood that the word "panel" as used throughout the specification and claims refers to panels of constant radius utilized in the fabrication of airplanes, especially the fuselage of such aircraft. Although "panels" as used herein refers to aircraft panels it should be understood that the equipment disclosed herein may be used to fabricate other and similar articles.

To the best of applicant's knowledge, previous equipment utilized in the fabrication of aircraft panels have been heavy, bulky and display numerous objectional features familiar to those skilled in the art. Briefly apparatus of this type include a pair of spaced carriages adapted to move along a track providing the X axes for the panel holding equipment. The carriages pivotally support a frame or panel supporting structure therebetween and on which the panel is mounted. The supporting structure in fact constitutes a fixture including necessary structure and components enabling a panel mounted thereon to be fabricated.

In presently known equipment of this type, each end of a frame member (panel supporting fixture) is supported by ball joints located a slight distance below a panel being fabricated therein. A reference line extending between the centers of the joints does not coincide with the true axis of a panel being fabricated thereon, it, therefore, becomes obvious that the ball joints must be adjusted (relocated) each time a new line of holes is being drilled by a drilling head having a fixed position. This adjustment is necessary if the axis of a hole being drilled in the panel is to have a normal relation with respect to the surface of a panel being fabricated therein. Also when the head of a flush type rivet is buckled the head of the rivet will not have a flush relation with respect to the surface of the panel unless proper adjustment is imparted to the ball joints. The construction of the present equipment is such that it overcomes the objectionable feature as outlined above.

Also the carriages include necessary operating components including pumps, motors, etc., providing lateral, vertical and rotational movement, or y, z and a axis movement, of the frame and panel. Accordingly, it is apparent the above equipment, viz, carriages, panel holding equipment, and equipment providing cooperation therebetween, constitute extremely heavy and bulky assemblies. This heavy and bulky facility must be incrementally moved (start and stop) approximately twenty (20) times per minute or 200 times (drilling, riveting) in securing a stringer to a surface (skin) sheet.

In contrast, in the present disclosure, the panel is supported only at its ends and otherwise provides its own supporting structure or frame. Prime movers, imparting movement to the panel along the $a$, $y$ and $z$ axis, are the only components mounted on and carried by the aforementioned carriages. Accordingly they constitute a relative light weight structure as compared with the known structures as just described. In fact, structures of the type just described represents only about one third ($\frac{1}{3}$) the weight of known structures designed to provide the same results.

An object of the present invention is to provide a panel positioning facility on which a panel may be fabricated which is much lighter and less bulky than conventionally known equipment for effecting the same operation.

Another object is to provide a facility in which the spacing, insofar as the drilling of holes and riveting are concerned, constitute surface measurements.

Although the characteristic features of the present invention are particularly pointed out in the appended claims, the invention itself, also the manner in which it may be carried out, will be better understood by referring to the following description taken in connection with the accompanying drawings forming a part of this application and in which:

FIGS. 1a and 1b constitute side elevational views of the fabrication facility disclosed herein.

FIGS. 2a and 2b are plan views of the facility of FIGS. 1a and 1b.

FIG. 3 constitutes a sectional view taken on the line 3—3 of FIG. 1a.

FIG. 4 is a detailed fragmentary view of a portion of FIG. 3.

Referring to the drawings, the figures show a panel positioning and actuating facility 11 of the type disclosed herein. Major components of the facility 11 include track, base and supporting assemblies 12, 14 and 16, respectively.

The track assembly 12 includes a pair of spaced tracks members 17 upon which the facility 11 operates (moves). The members 17 are secured in concrete 18 and thus provides a firm foundation for the members 17. The members 17 have a parallel and level relation and provides means on which the facility 11 is actuated. The center line of the track assembly 12, identified by the line x—x in FIGS. 2a and 2b, constitutes the x axes of the facility 11. In this respect the facility also has $a$, $y$ and $z$ axis, represented by the line a—a, y—y and z—z, respectively, (FIGS. 3 and 4) and which will be discussed further as the disclosure progresses.

The base assembly 14 includes lower and upper structures 20 and 25, respectively. The lower structure 20, on which the facility 11 is actuated, will be discussed first.

The structure 20 constitutes longitudinal and lateral extending members 23 and 24, respectively, providing substantially a rectangular structure. The members 23 provide bearing supports for the wheels 30 on which the facility 11 is actuated (moved) along the x axis.

Actuation of the structure 20 is provided by an electric motor 26. The driving shaft of the motor 26 extends through one of the rails 17, the latter providing a bearing support for the shaft. The shaft of the motor 26 carries a pair of pinion gears 28, meshing with rack members 29 secured to longitudinally extending members 23, to provide actuation thereof along the x axes. Thus it will be seen that the facility will be actuated (moved) on the wheels 30 at such time as the motor 26 is energized.

The upper structure 25 of the facility 11 is also constructed of a plurality of structural members 31 and 32 extending laterally and longitudinally, respectively, of the facility 11 to provide a substantially rectangular structure. The structure 25 is supported on the structure 20 by means of jack members 33, positioned at each end of the structures 20 and 25. The jack members 33 are actuated by an electric motor 34 driving through a shaft 36. Pivotal support for the shaft 36 is provided by the lateral members 24 of the lower assembly 20.

Relative movement of the structures 20 and 25, in longitudinal and lateral direction, is precluded by vertically mounted bearing members 37', four of the bearing members being located at each end of the structures. The bearing members 37' allow the upper structure 25 to be moved between elevated and lowered positions but preclude lateral and longitudinal movement therebetween, as stated above the structure 25 may be moved vertically, with respect to the lower structure 20, by the jack members 33. Vertical movement of the structure 25 is referred to as z axis movement of the facility 11 as represented by the line z—z in FIG. 3.

The facility 11 includes a pair of support assemblies 16, one being positioned at each end of the facility. The assemblies 16 constitute right and left hand assemblies, accordingly the description of one will apply equally well to the other.

The assembly 16 includes a pair of spaced plate members 37 constituting segments of a circle. The straight edges of the members 37 are fixedly secured to the upper structure 25 with the members 37 extending vertically above the structure 25 as best seen in FIG. 4. The arcuate edges of the members 37 are pointed or have a V shape configuration to provide track means for rollers 35 as presently explained. The arcuate edges of the plates 37 have a constant radius, somewhat less than the radius of a panel 22 being fabricated on the facility 11. As mounted, the centers of the radial edges of the members 37, identified by R in FIG. 3, are located on the z axis of the facility 11 as identified by the letter C.

The peripheral portion of the aforementioned rollers 35 have a V shaped groove formed therein mating with the V shaped configuration of the arcuate edges of the members 37. Rotatably mounted in plate members 40, 41, 42 and 44 are the hubs of the rollers 35, the latter members also constituting segments of a circle. Specifically as mounted the outer edges of the members 40, 41, 42 and 44 have a constant radius somewhat less than the radius of the aforementioned panel 22. Spanning the members 40, 41, 42 and 44 and secured thereto is a plate member 43. Inasmuch as the plate member 43 is contoured and secured to the curved edges of the plates 40, 41, 42 and 44 it defines a curved surface of constant radius, concentric with respect to the curved edges of the plate members 37 and somewhat less in radius than the radius of the panel 22.

The plate member 43 extends beyond the plate member 41 (left hand member in FIG. 4) and has the plate member 44 depending therefrom. This member (member 44) has a flanged member 46 secured thereto, the lower edges of which has a concentric relation with respect to the curved edges of the members 37 and carries a gear rack on the lower side thereof functioning in a manner presently explained.

Extending through and supported by the plate members 40, 41, 42 and 44 are a pair of rod members 48. The rod members 48 normally have a fixed relation with respect to the members 40, 41, 42 and 44, however, structure is provided thereon allowing a sliding movement therebetween when desired. The rod members 48 carry pad members 49 at the inner ends thereof. The pad members 49 define curved surfaces of constant radius and concentric with respect to the curved edges of the plate members 37 but somewhat less than the radius of the panel 22.

Secured to the plate members 37 is a restraining member 51. The inner and lower edge of this member 51 has a constant radius and contacts a plurality of rollers 52 rotatably mounted on the plate member 44. By referring to FIG. 4, it will be seen that movement of the plate members 40, 41, 42, 43 and 44 is confined between the rollers 35 and rollers 52. In other words, at such time as a panel 22 is mounted on the assembly 16, and rotationally moved either to the right or left (beyond the limits of plate members 37 and becomes unbalanced), the rollers 35 and 52 function to retain the relative position of the panel 22 on the supporting structure 16.

Angular movement about the point C (FIG. 3) is imparted to the panel 22 by a pinion gear 53 which meshes with the rack member 46 resulting in rotational movement of the panel 22 about the center "C." Rotational movement of the gear 53 is imparted thereto by an electric motor 56 acting through a shaft 54. Thus it will be seen that rotational movement is imparted to the panel 22, as indicated by the arcuate line a—a in FIG. 3, at such time as the motor 56 is energized, this movement being referred to as a axis movement.

Components of the facility 11 having been described a better understanding thereof, also the manner in which the components cooperate with the machine 21 (dotted lines in FIG. 3) will be forthcoming from the following description of a fabrication operation effected on the facility 11, i.e., the fabrication of the panel 22.

The machine 21 and facility 11 is numerically controlled, accordingly its operation is responsive to a previously prepared tape. In other words the operation of the machine 21 and facility 11 are entirely automatic after the cycle of operation is initiated. Inasmuch as the preparation of the tape is not subject matter of the present invention, only mechanical features of the facility 11 and the manner in which it cooperates with the machine 21 will be discussed in the following description.

Prior to performing a fabrication operation on the facility 11, the upper structure 25 is positioned in its lowered position as indicated by the numeral 22" in FIG. 3. The rod members 48 are adjusted so that the ends of the panel 22 is supported on the pad members 49. In this position, as best seen in FIG. 3, the stringers 57, accordingly the panel 22, are secured to the pad members 49 by means (not shown). Mounted in this manner, it becomes apparent that rotational movement of the pinion gears 53 result in angular movement of the panel 22.

The panel 22 is now elevated to its raised position as indicated by the numeral 22' in FIG. 3, in which the skin of the panel 22 is directly below and in contact with the working head of the machine 21. This movement constitutes movement on the z axis of the facility 11, is effected by the jack member 33. The ram member of the machine 21 is now raised and allowed it to enter one of the hat shaped stringers 57. So positioned a drilling or riveting operation is now effected on the panel 22.

The fabrication operation just described—is normally initiated in connection with a stringer 57 located either at the right or left hand edge of the panel 22. After the initial hole drilling and riveting operations are effected, the ram or bucking tool of the machine 21 is lowered, the upper structure 25 is lowered and the facility 11 incrementally moved along its x axis to a new position (equal to the pitch between holes or rivets). The sequence of operations—just described—are repeated and a second hole and rivet bucking operation effected.

The operation is continued until all rivets associated with one of the stringers 57 are installed. The panel 22 is then rotated by means of the pinion gear and racks 53 and 47, respectively, positioning an adjacent stringer 57 directly in line with the working head of the machine 21 and operations as described above effected until the second stringer 57 is completely secured (riveted) to the covering sheet (skin) of the panel 22. This operation is repeated until all stringers 57 are secured (riveted) to the cover sheet (skin) of the panel 22.

In view of the above explanation of a fabrication operation, also from previous discussions of components comprising the facility 11, it will be apparent that the cover sheet (skin) is maintained normal to the working head of the machine 21 at the point of operation, in other words the point at which a hole is being drilled or rivets bucked. Also all measurements (rivet spacing, spacing between stringers etc.) constitute measurements taken on the surface of the panel 22. The above is due to the fact that the plate members 37, pad members 49 and the gear rack 47 have a concentric relation with respect to each other, that is they all rotate about a common point located on the z axis at the point C. This feature speeds the preparation of a tape and renders its preparation more economical than by methods presently known.

Thus it will be seen that a fabrication facility is disclosed which provides movement along its x, a and z axes and accordingly imparts lateral, (rotational), longitudinal and vertical movement to a panel mounted on the facility 11.

While in order to comply with the statute, the invention has been described in language more or less specific as to structural features, it is to be understood that the invention is not limited to the specific features shown, but that the means and construction herein disclosed comprise a form of putting the invention into effect, and the invention is, therefore, claimed in any of its forms or modifications within the legitimate and valid scope of the appended claims.

What is claimed is:

1. In apparatus facilitating drilling and riveting operations to be effected on a panel constituting a portion of a hollow cylinder, comprising:
  (a) an elongated lower structure having parallel side members and being symmetrically constructed about a longitudinal axis located midway between said side members;
  (b) an elongated upper structure mounted on said lower structure for movement between elevated and lowered positions;
  (c) supporting structures mounted at each end of said upper structure and normally having a symmetrical relation in a lateral sense with respect to a vertical plane coincident with and parallel to said longitudinal axis;
  (d) each of said supporting structures including a plate the upper surface of which defines a portion of a cylinder, the radius of which is substantially equal to that of a panel being fabricated on the apparatus;
  (e) and means for imparting rotational movement to said curved plates whereby the uppermost longitudinal extending element thereof is at all times coincident with and parallel to said vertical plane.

2. In apparatus as set forth in claim 1:
  (a) including jack means extending between and located at each end of said lower and upper structures whereby the latter may be actuated between said elevated and lowered positions;
  (b) and bearing means located at and extending between said upper and lower structures allowing vertical movement of said upper structure with respect to said lower structure and precluding lateral or longitudinal movement therebetween.

3. In apparatus as set forth in claim 2:
  (a) in which said supporting structures are located adjacent the ends of said upper structure;
  (b) each of said supporting structures including a pair of spaced plates constituting segments of circles;
  (c) the straight edge of each segmented plates being fixedly secured to said upper structure and having a horizontal relation;
  (d) roller means contacting and rolling on the curved edges of said segmented plates;
  (e) said curved plates mounted on said rollers whereby said rotational movement may be imparted thereto;
  (f) and said means for imparting said rotational movement to said curved plate constitutes an electrical motor located at one end of said upper structure.

4. In apparatus as set forth in claim 3:
  (a) in which each of said supporting structures include a plate depending from said curved plates the lower edge of which carries a gear rack having a concentric relation with respect to said curved plates;
  (b) and a pinion gear meshing with said gear rack for imparting said rotational movement to said curved plate.

5. In apparatus as set forth in claim 4:
  (a) in which each of said supporting structures include restraining means functioning to retain said rollers in contacting relation with said segmented plates as said rotational movement is imparted to said curved plate.

6. In apparatus facilitating drilling and riveting operation to be effected on a panel constituting a portion of a hollow cylinder, comprising:
  (a) an elongated lower structure having parallel side members and being symmetrically constructed about a longitudinal axis located midway between said side members;
  (b) an elongated upper structure mounted on said lower structure for movement between elevated and lowered positions;
  (c) supporting structures mounted on each end of said upper structure and normally having a symmetrical relation in a lateral sense with respect to a vertical plane coincident with and parallel to said longitudinal axis;
  (d) each of said supporting structures including a curved plate the upper surface of which defines a position of a cylinder having a concentric relation with a panel being fabricated on said equipment;
  (e) and means for imparting rotational movement to said curved plates whereby the uppermost longitudinal extending element thereof is at all times coincident with and parallel to said vertical plane.

References Cited

UNITED STATES PATENTS

| | | | |
|---|---|---|---|
| 2,277,631 | 3/1942 | Bullock | 269—58 |
| 2,638,662 | 5/1953 | Rothwell | 269—58 X |

ROBERT C. RIORDON, Primary Examiner

D. D. EVENSON, Assistant Examiner

U.S. Cl. X.R.

29—420; 227—51, 152